Patented Feb. 10, 1925.

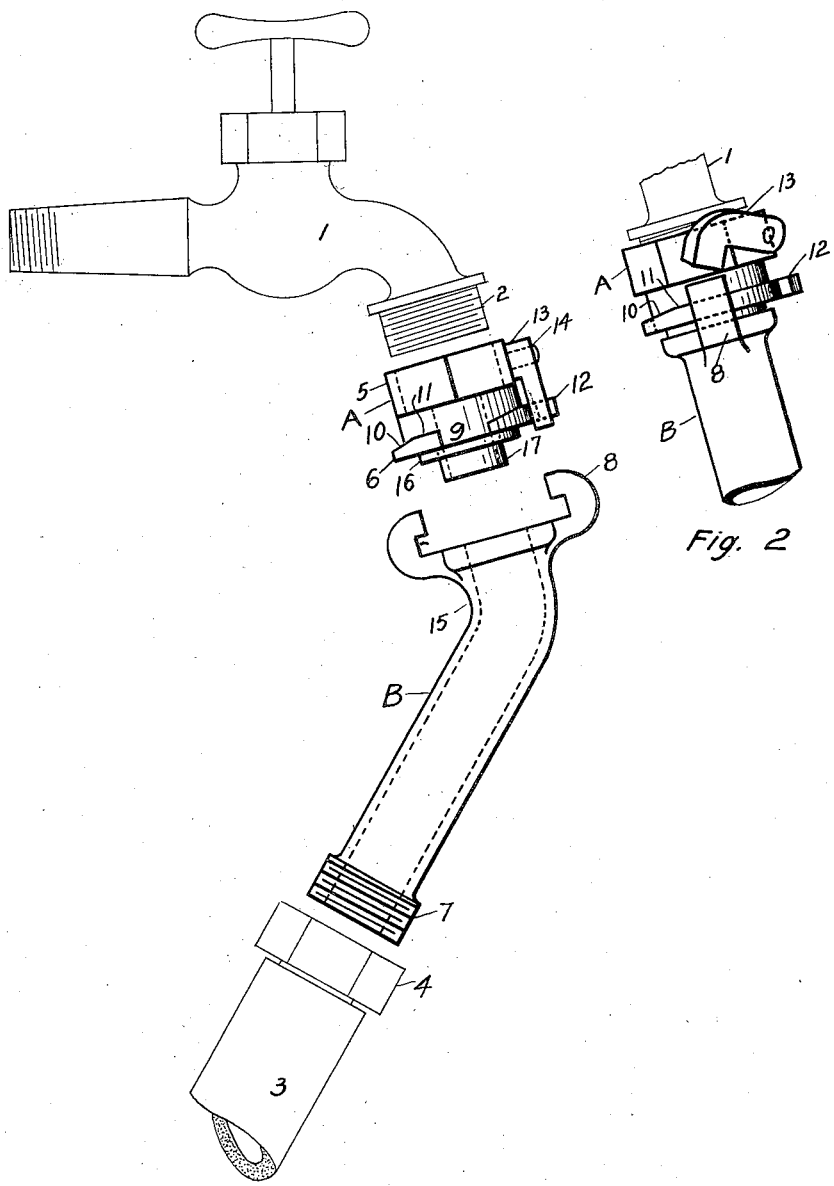

1,525,794

UNITED STATES PATENT OFFICE.

ANTON BLAKE, OF OAKLAND, CALIFORNIA.

HOSE-BIB COUPLING.

Application filed April 15, 1922. Serial No. 553,047.

*To all whom it may concern:*

Be it known that I, ANTON BLAKE, a citizen of the United States, and resident of the city of Oakland, county of Alameda, and State of California, have invented a new and useful Hose-Bib Coupling, of which the following is a specification.

The invention relates in general to couplings, and in particular to a hose-bib coupling in which one part may be permanently attached to a hose-bib and the remaining part to the hose and is primarily adapted for home use, although it may be used for other than garden purposes and elsewhere than the home.

The chief objects of the invention are, the provision of a quick and easily attachable and detachable effective coupling, having in view that the bib-piece of coupling may be furnished separately or in numbers, one for each garden bibcock, while but one hose-pipe of the coupling will suffice for the hose, as but one hose is used in the home while two or more bibcocks are ordinarily located about the grounds of the home.

Another object of the invention is the provision of a new article of manufacture, a hose-bib coupling, which may be kept in stock by plumbers, and hardware and other stores as shelf-goods and may be purchased as such and applied by a user without professional help.

In its main features, the invention comprises two members adapted to be put together for a secure union by less than a half turn. One of said members is provided with a threaded female end adapted to engage a male end such as on a hose-bib, and the other member is provided with a threaded male end adapted to engage the female coupling fitting, such as on the end of a hose. The latter member of the invention is preferably curved at an angle of about 45 degrees, and is long enough to serve as a handle in making a connection. The two members of the invention are then brought together and engaged by means of a flange on one, and engaging hooks on the other, which will be fully described hereinafter in connection with the accompanying sheet of drawings, in which I have illustrated an embodiment of the invention, and in which:

Figure 1 is an elevation of my device uncoupled and in conjunction with a hose-bib and the faucet-end of a hose, and Fig. 2 is a side elevation of the device coupled, and engaged with the male end of the hose-bib, but part of the hose portion of my coupling being shown.

Referring to the figures:—The hose-bib 1 is provided with the ordinary male threaded end 2, and the end of hose 3 is provided with the ordinary female threaded coupling fitting 4. Adapted for interposition between these two is my new article of manufacture, comprising the two parts A and B. The part A is provided with a female nut portion 5 at one end, and at its other end with a flange 6, to be presently described. The part B is provided at one end with a male thread 7 adapted to engage the female hose fitting 4, and at the other end with two hooks 8, arranged by preference diametrically opposite each other, and projecting longitudinally therefrom. These hooks 8 are adapted to engage the flange 6, being entered through notches or cut-out portions 9 therein and provided for that purpose. The hooks 8 being entered through the openings 9, the member B is given a turn, causing the hooks to ride up the inclined portions 10 of the flange adjacent to the openings, thus drawing the members A and B closely together. At the top of the inclines the hooks ride on a straight face 11 and against a stop 12, or this face may have a reverse incline if desired. When the hook 8 is against the stop 12, a latching-hook 13, which may be pivoted as at 14 to the nut portion 5, may be turned to engage the end of hook 8 and check its backward movement in service. The latching-hook 13 has a sharp-angled turn at the point where it contacts the end of hook 8, and the latter has a sharp angle at the meeting point, whereby the retaining power of latching-hook 13 is increased.

For some purposes member B may be a straight member, but I prefer to make it angular and of about 45 degrees. From the angle 15 to the end of the threaded portion 7, the body is made preferably as long as practicable, to act as a handle and lever in turning the member for engaging and disengaging it from member A.

The common packing washer 16, may be slipped over the usual centering nipple 17, and thus be also between the meeting faces of the members A and B.

In Fig. 1 I have shown the latching-hook depending and in Fig. 2 raised, ready to engage hook 8, should the latter travel further toward stop 12. From experience I have found that the coupling positioned on the straight face as shown in Fig. 2, has no tendency to back off when the hose is in service and when a fresh washer is used between the joint, but when the washer becomes worn I then find it preferable to tighten the coupling further, and engage the latching hook by turning it down with the finger.

In some cases, such as a special order, I may prefer to cast member A of my coupling as part of the hose-bib taking the place of the male end 2 thereof, because as previously stated, but one member B will suffice for all the hose-bibs in the garden, therefore the hose-bib in this relation may also be considered the part A of my invention.

Having described my invention, I do not wish to be limited to the precise construction of it as shown, but wish to include all variations of the invention that come within the spirit and scope of the claim, which now follows.

I claim:—

A hose bib coupling comprising in combination, a tubular handle-portion having threads on one end thereof to engage a standard female hose-fitting and the other end provided with two hooks projecting from a flat surface surrounding the central hole, and a cylindrical nut portion having wedge-shaped flanges projecting therefrom and adapted to be engaged by the said hooks, a centering nipple projecting from the said nut and adapted to engage the said central hole, threads in the other end of said nut adapted to be screwed to a standard male bib-fitting, a latch pivoted on one side of said nut, said latch being hook-shaped to hook over one of said projecting hooks on said tubular portion to hold the coupling members inseparable, the whole being a new article of manufacture directly attachable to existing threaded fixtures by the purchaser thereof.

ANTON BLAKE.